US008150994B2

(12) United States Patent
Clark et al.

(10) Patent No.: US 8,150,994 B2
(45) Date of Patent: Apr. 3, 2012

(54) PROVIDING FLOW CONTROL AND MODERATION IN A DISTRIBUTED MESSAGE PROCESSING SYSTEM

(75) Inventors: Wayne A. Clark, North Bend, WA (US);
Lee B. Graber, Kirkland, WA (US);
Kartik Paramasivam, Redmond, WA (US); Siddhartha Roy, Bothell, WA (US); Sanjib Saha, Bothell, WA (US);
Sumitra Sujanani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1111 days.

(21) Appl. No.: 11/144,412

(22) Filed: Jun. 3, 2005

(65) Prior Publication Data

US 2006/0277317 A1 Dec. 7, 2006

(51) Int. Cl.
*G06F 15/16* (2006.01)
(52) U.S. Cl. .................... 709/235; 709/232; 709/233
(58) Field of Classification Search .............. 709/224, 709/230, 235, 223, 226, 232, 233, 234; 370/229–240; 718/105; 712/216
See application file for complete search history.

(56) References Cited

U.S. PATENT DOCUMENTS

| | | | | |
|---|---|---|---|---|
| 5,193,151 A | * | 3/1993 | Jain ............................... | 709/237 |
| 5,386,585 A | * | 1/1995 | Traylor .......................... | 712/29 |
| 5,400,329 A | * | 3/1995 | Tokura et al. ................. | 370/232 |
| 5,519,835 A | * | 5/1996 | Nakagaki et al. ............. | 709/234 |
| 5,751,969 A | * | 5/1998 | Kapoor ......................... | 709/235 |
| 5,805,577 A | * | 9/1998 | Jain et al. ...................... | 370/234 |
| 5,920,899 A | * | 7/1999 | Chu .............................. | 711/169 |
| 5,956,519 A | * | 9/1999 | Wise et al. ..................... | 712/16 |
| 6,023,453 A | * | 2/2000 | Ruutu et al. .................. | 370/229 |
| 6,192,422 B1 | * | 2/2001 | Daines et al. .................. | 710/29 |
| 6,219,713 B1 | * | 4/2001 | Ruutu et al. .................. | 709/235 |
| 6,405,258 B1 | * | 6/2002 | Erimli et al. ................. | 709/235 |
| 7,000,025 B1 | * | 2/2006 | Wilson ......................... | 709/235 |
| 7,080,238 B2 | * | 7/2006 | Van Hoof et al. ............. | 712/234 |
| 7,382,366 B1 | * | 6/2008 | Klock et al. ................. | 345/213 |
| 7,401,154 B2 | * | 7/2008 | Ignatius et al. ............... | 709/232 |
| 2002/0054594 A1 | * | 5/2002 | Hoof et al. .................... | 370/389 |
| 2002/0188691 A1 | * | 12/2002 | Ignatius et al. ............... | 709/208 |

(Continued)

OTHER PUBLICATIONS

Jonathan Chao, Architecture Design for Regulating and Scheduling User's Traffic in ATM Networks, 1992, ACM, pp. 77-87. http://delivery.acm.org/10.1145/150000/144225/p77-chao.pdf?key1=144225&key2=5052774221&coll=GUIDE&dl=GUIDE&CFID=7726715&CFTOKEN=64481878.*

(Continued)

*Primary Examiner* — Abdullahi Salad
*Assistant Examiner* — Jimmy H Tran
(74) *Attorney, Agent, or Firm* — Woodcock Washburn LLP (57) ABSTRACT

Systems and methods for controlling the work load on a distributed system comprising a plurality of stages are provided. The capacity of a present stage is monitored, using either various resources of the present stage or rates of work completion and work receipt of the present stage. Information indicating the capacity of a succeeding stage are obtained and communicated to the present stage. The monitored capacity information of the present stage and the communicated information of the succeeding stage, either alone or in combination, are used to determine if a throttling action is necessary to control the load of work at the present stage. A provided throttling technique inserts an appropriate delay before the present stage to allow the present stage to process an amount of work without saturating the capacity of the present stage. This technique is applied at each stage of the distributed system to control the work load of the overall system by controlling the work load at each stage.

13 Claims, 6 Drawing Sheets

U.S. PATENT DOCUMENTS

| | | | |
|---|---|---|---|
| 2003/0097461 A1* | 5/2003 | Barham et al. | 709/235 |
| 2004/0003107 A1* | 1/2004 | Barham et al. | 709/235 |
| 2004/0046590 A1* | 3/2004 | Singh et al. | 326/93 |
| 2004/0133391 A1* | 7/2004 | Bovo et al. | 702/178 |
| 2005/0122985 A1* | 6/2005 | Murphy | 370/401 |
| 2007/0058547 A1* | 3/2007 | Berstis | 370/232 |

OTHER PUBLICATIONS

Floyd et al.; Random Early Detection Gateways for Congestion Avoidance; Aug. 1993.*

Jain et al.; The OSU Scheme for Congestion Avoidance in ATM networks Using Explicit Rate Indication; Sep. 1998.*

Digital Equipment Coporation; Congestion Avoidance in Computer Networks with a Connectionless Network Layer, Part IV-A Selective Binary Feedback Scheme for General Topologies; Aug. 1987.*

Floyd et al.; Equation-based congestion control for unicast applications; May 2000.*

Nilsson et al.; The Incremental Deployability of RTT-Based Congestion Avoidance for High Speed TCP Internet Connections; 2000.*

Padhye et al.; Modeling TCP throughput: A simple model and its empirical validation; 1998.*

Sykas et al.; Congestion avoidance in ATM networks; May 1992.*

* cited by examiner

PROVIDING FLOW CONTROL AND MODERATION IN A DISTRIBUTED MESSAGE PROCESSING SYSTEM

BACKGROUND

In a message processing system comprised of a plurality of stages, one stage interacts with another stage by communicating work, such as messages, in a work flow to the subsequent stage. The effectiveness of this work flow is important to, and in effect determines, the overall operability of the system. Each stage, or component, which may also be thought of as a subsystem of the overall system, has a capacity to perform work and is responsible for and capable of receiving the work from the previous stage, processing the work, and transmitting work to the next stage. The completion of such tasks consumes various resources at each stage; and the consumption of the resources has a direct effect on the functionality of the system, as the processing capacity of each stage is a function of its resources. Often the present capacity of a subsystem is not easily measurable and the exact resource requirement for performing an individual task is not predictable. In addition, a subsystem may concurrently process a heterogeneous workload, thus making the quantification of the subsystem capacity and prediction of the resource consumption difficult. In order for the system to function at an optimal level, each stage of the system must optimally use its resources. This is because each stage contributes to the overall system. For example, if all stages of a message processing system are using their resources at an optimal level, the overall system will achieve maximum throughput, or production of the system in a given time. If, however, just one stage of the system is not appropriately utilizing its resources, the system will experience either an accrual of work, in response to the over-utilized stage, or the system will be under-worked as more work could be handled or processed by the system.

Various factors contribute to the utilization, and hence to the overall operation, of a message processing system. One such factor is the arrival rate of work to the system. When the work arrival rate is very high, the system, or one or more stages, is expending its resources on the arrival and cannot attend to handling the actual work. One particular stage may be overburdened with incoming messages or work, while the next stage is idle, waiting to receive the work load. The utilization of one stage causes a ripple or cascading effect on all of the succeeding stages. When the system is in this state, i.e., when the incoming rate of work is too much for it to handle, the system is thrashing. As too much work for the system is received, a number of problems ensue. Errors may result; the type of work the system is handling, such as messages or data, may be lost; or the system may become unresponsive or slow.

Throttling techniques are employed in message processing systems to prevent the system from thrashing. A throttled system controls the work flow of the system so that the system is only handling the amount it can properly process and is therefore neither under-utilized nor over-utilized. A message processing system that utilizes throttling techniques conducts an examination of the system throughout operation to determine when the system is not operating in an optimal state. Such a situation is known as a stress situation. When a stress situation is discovered, throttling actions are taken to mitigate the problem.

Throttling techniques are presently utilized in many types of message processing systems and similar systems in which work is processed and transferred between system components and wherein resources are consumed in performing such operations. However, various problems exist with such presently-used techniques. One such drawback is that the detection of stress situations is dependent upon the user of the system. The user is responsible for determining the threshold values for the various resources, but, often times, the user does not have the data necessary to do so, and the data is very dynamic in nature. This is particularly so when the message processing system comprises a series of stages, where effective throttling would require information about the capacity and resource utilization of the individual stages. Furthermore, when a stress situation is detected and necessary measures are employed to alleviate the problem, the system stays in this mode and does not re-evaluate to determine if, at a later time, the system can handle an increased workload.

Accordingly, in light of the above considerations and limitations, improved systems and methods for controlling the flow of work in a distributed message processing system comprising a plurality of stages are highly desired. The present invention satisfies this need.

SUMMARY OF THE INVENTION

The present invention provides a throttling and flow control method for use in a distributed system comprising a series of successive stages, wherein each stage has a capacity to perform work and consumes resources while performing such work. According to the present invention, throttling techniques are performed and applied at each individual stage of the system. In this manner, each stage is contributing to the operability of the system by optimizing the flow between successive stages.

In one embodiment, each stage of the distributed system monitors its capacity to perform work and also receives information indicating the capacity of a succeeding stage to perform work. Based on the information obtained from the succeeding stage and the monitoring of the capacity of the present stage, the present stage may perform a throttling action. In this manner, each stage may perform throttling actions independently to optimize the overall throughput of the system.

In one embodiment, the capacity of a present stage to perform work is monitored by comparing a state of a resource of the present stage to a pre-defined threshold value. When the state of the resource exceeds a pre-defined threshold, this serves as an indication to the present stage that the resources are being consumed beyond a desirable limit and that, accordingly, a throttling action may be necessary in order to control the resources of the stage. In another embodiment of the present invention, the capacity of the present stage is monitored by calculating both the rate of new work being received by the stage and the rate that the stage is processing or completing the work. The comparison of the rates provides an indicator as to whether or not the stage is backlogged with work and is receiving more work than it can process.

Other advantages and features of the invention are described below.

BRIEF DESCRIPTION OF THE DRAWINGS

The foregoing summary and the following detailed description of the invention are better understood when read in conjunction with the appended drawings. Exemplary embodiments of the invention are shown in the drawings, however it is understood that the invention is not limited to the specific methods and instrumentalities depicted therein. In the drawings.

DETAILED DESCRIPTION OF THE INVENTION

Figure 1:
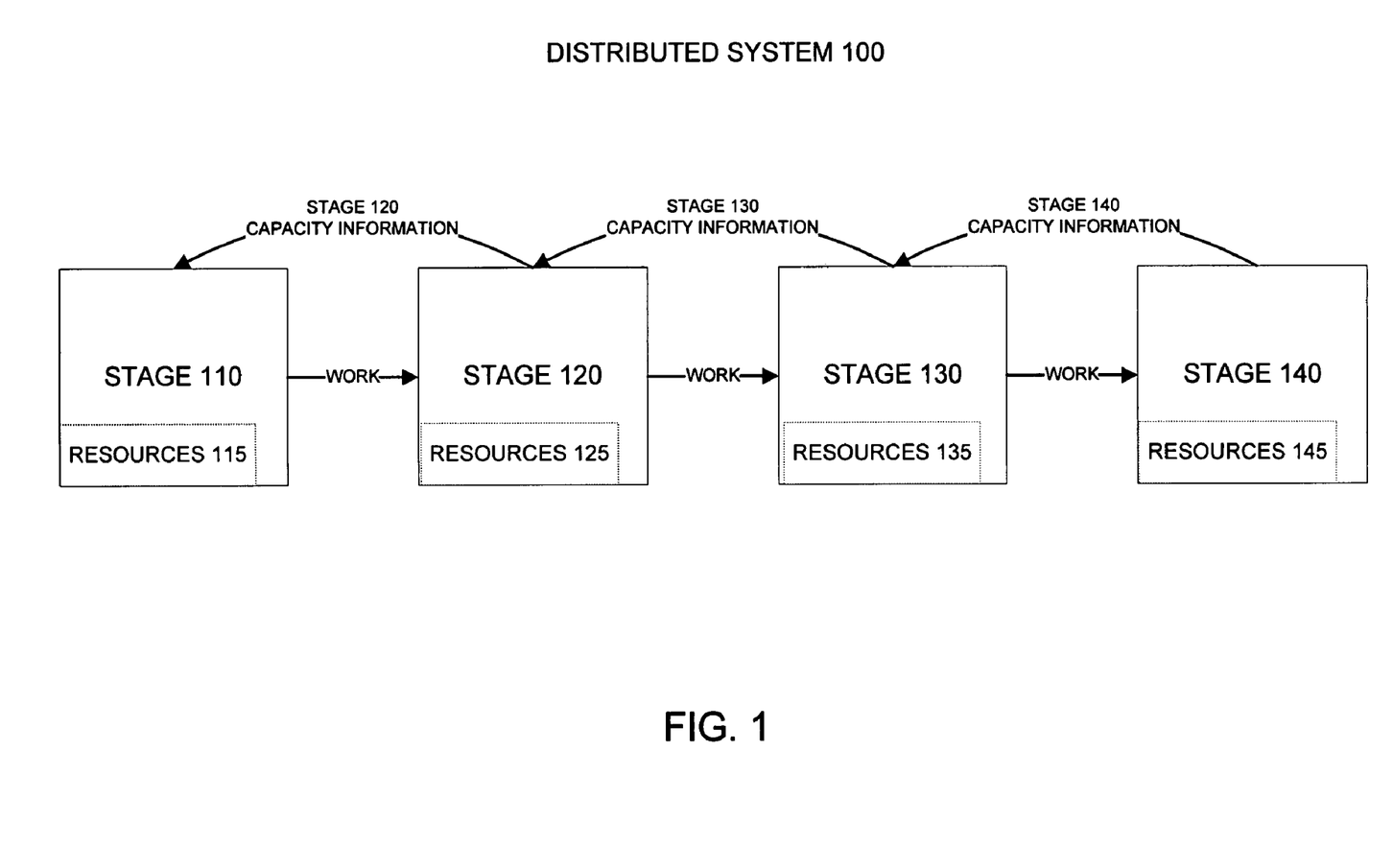
FIG. 1 is a block diagram representing a distributed system in which the present invention may be embodied.

FIG. 1 is a block diagram of a distributed system 100 in accordance with an embodiment of the present invention. As shown, the system 100 comprises a plurality of stages, namely Stage 110, Stage 120, Stage 130, and Stage 140. Each stage has a capacity to perform work and may consume local and/or global resources while doing so. The resources of each stage are denoted in FIG. 1 as Resources 115, Resources 125, Resources 135, and Resources 145, respectively. While the system 100 is illustrated in FIG. 1 as having four stages, it is understood that this is merely an example and that the present invention can be embodied in distributed systems having any number of stages. Thus, the present invention may incorporate more or less stages than illustrated in FIG. 1. In addition, each stage may comprise one or more components in a server, network, or computer, or a stage may comprise a server, network, or computer in itself. Moreover, the stages may not be of the same type, nor will they necessarily perform the same functions. Typically, each stage will perform a function necessary to the overall task of the system. A stage of the distributed system may be embodied in a software component, module or routine containing program code that, when executed, performs certain functions in accordance with the tasks of the distributed system.

The responsibility of the distributed system 100, as illustrated in FIG. 1, is to perform one or more specified tasks. Such tasks include, by way of example and without limitation, processing messages in a server and publishing messages through the use of a subscription store and message queue. In performing such tasks, each stage receives work from a previous stage and transmits work to a subsequent stage. Each stage may be thought of as a subsystem of the system 100 as each stage performs a specific task. The ability of each subsystem to perform its work is a function of the capacity of each subsystem, which is a function of the resources of each subsystem. Therefore, the utilization of the resources results in the quality of the work performance of the overall distributed system 100.

Accordingly, for the system 100 to operate at its optimal level, the work load generated by one stage and transmitted to a subsequent stage must not be too great for the capacity of the subsequent stage to handle. In accordance with an embodiment of the present invention, throttling techniques are employed at each stage of the system 100 to control the work load at that particular stage, thereby controlling the overall work load and throughput of the system 100.

Each stage of the system 100 monitors the capacity of the present stage and obtains information about the capacity of the succeeding stage from the succeeding stage. The stage then uses the monitored information about the present stage and the information obtained from the succeeding stage to perform a throttling action to control the load on the system 100. Referring to FIG. 1, for example, Stage 110 receives information from Stage 120 about the capacity of Stage 120 to perform work. Using this information in conjunction with the monitoring of its own capacity, Stage 110 performs a throttling action. For example, the monitored information about Stage 110 and the capacity information from Stage 120 may indicate to the present stage, Stage 110, that Stage 110 and Stage 120 are overburdened with work. Accordingly, as an example of a throttling action, Stage 110 may delay the receipt of work into Stage 110, thereby reducing the work flow at both Stage 110 and Stage 120. Similarly, and in accordance with the present invention, Stage 120 monitors the capacity of Stage 120 and gathers information about the capacity of Stage 130. Stage 120 may then perform an appropriate throttling action at Stage 120 based on this information. Stage 130 and Stage 140 perform similar operations, and so on.

In accordance with one embodiment, a present stage may also communicate information indicating the capacity of the present stage and any information it has obtained from a succeeding stage to a preceding stage. The preceding stage may then perform a throttling action based, at least in part, on the information transmitted to it from the present stage.

Figure 2:
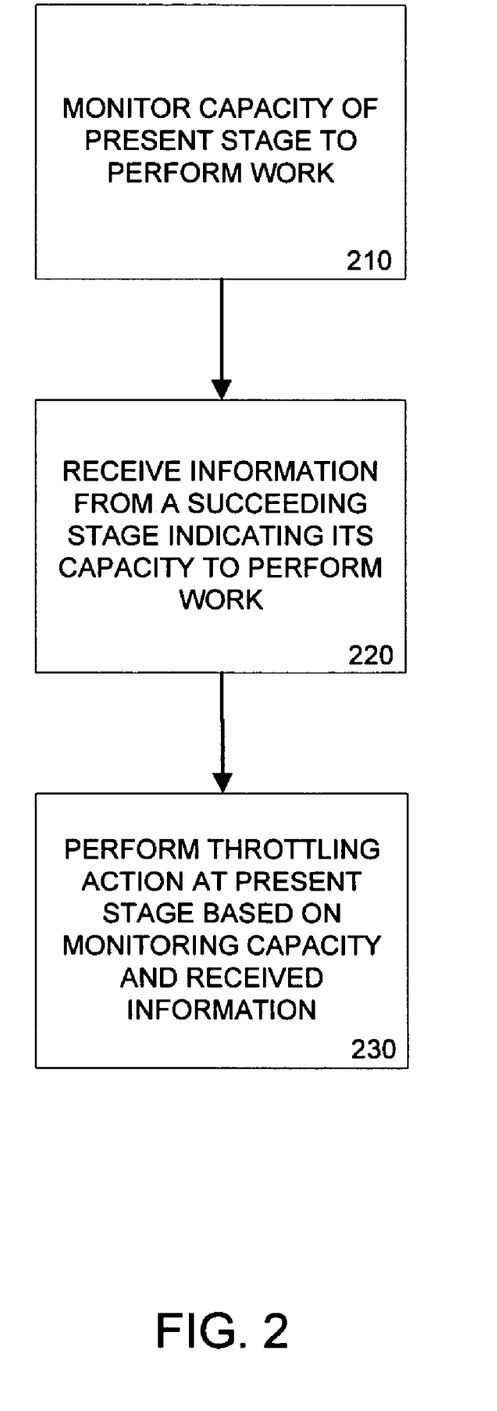
FIG. 2 is a flow diagram illustrating one embodiment of a method of controlling the work load in a distributed system in accordance with the present invention.

FIGS. 2 illustrates an embodiment of a method for controlling the overall work load on the distributed system 100 in accordance with the present invention. Referring to FIG. 2, at step 210 the present stage monitors the capacity of the present stage to perform work. At step 220, information about the capacity of a succeeding stage to perform work is provided to the present stage. At step 230, the present stage then uses both the monitored capacity of the present stage to perform work and the received information about the capacity of the succeeding stage to perform work in order to perform an appropriate throttling action at the present stage.

Figure 3A:
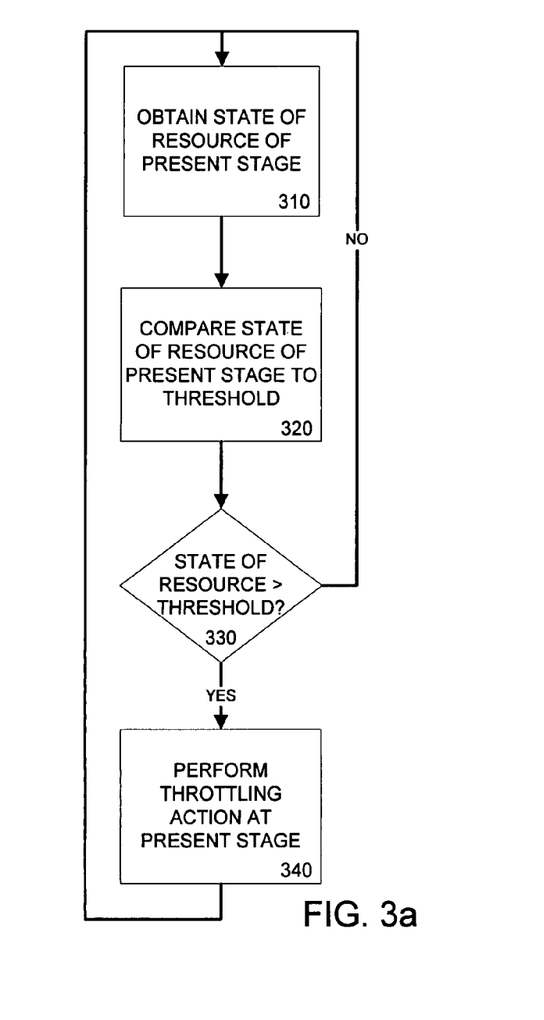
FIGS. 3a and 3b are flow diagrams illustrating embodiments of methods of controlling the work load in a distributed system in accordance with the present invention.

FIG. 3a is flow diagram illustrating further details of the steps 210-230 of the method of FIG. 2, in accordance with one embodiment of the invention. As shown, the monitoring step 210 of the method of FIG. 2 may, in this embodiment, begin at step 310 by obtaining information about a state of a resource of the present stage and continue at step 320 by comparing the state of the resource of the present stage to a threshold value. The threshold value may be a predetermined indicator based on the particular system and may be adjusted dynamically based on an analysis of the recent load characteristics of the system. If, at step 330, the state of the resource exceeds the threshold value, this serves as an indicator that a throttling action may be needed in order to control the load on the system. Thus, at step 340, a throttling action may be performed at the present stage (essentially step 230 in FIG. 2). If, however, step 330 indicates that the state of the resource of the present stage does not exceed the predetermined threshold value, a throttling action is not executed. Preferably, the process illustrated in FIG. 3 is performed periodically to provide continuous monitoring of the capacity of the present stage to perform work.

The information that the present stage receives from the succeeding stage (step 220 of the method of FIG. 2) about the capacity of the succeeding stage to perform work may also be determined and processed in the manner illustrated in FIG. 3a. In one embodiment, the present stage may receive information from the succeeding stage concerning the state of a resource at the succeeding stage. The present stage may then compare that received information to a threshold value maintained by the present stage (i.e., step 320) and take an appropriate throttling action (i.e., step 330) if the threshold value is exceeded. Thus, throttling actions may be taken based on either the monitored capacity of the present stage to perform work, information received from the succeeding stage about its capacity to perform work, or a combination of both.

The present stage may take a variety of different actions in order to throttle the work load of the system. One example of a throttling action is delaying the receipt of work into the present stage. Another example of a throttling action is delaying the generation and/or transmission of work from the present stage to the succeeding stage. Yet another example of a throttling action is controlling various resource allocations that are required for the receipt and processing of work.

The monitored resource at a given stage may comprise any resource that the stage consumes in order to perform its function. Examples of the kinds of resources that may be consumed include, without limitation, a system-wide usage of a physical memory, a process memory, a thread count, a number of open database connections, and a capacity in terms of concurrent messages. While the method of FIG. 3 illustrates the monitoring of a single resource, it is understood that the present invention is by no means limited thereto. Rather, the present stage may monitor, or receive information from a succeeding stage about, multiple resources and may base a decision to perform a throttling action on the stage of any one of those resources or on the combined state of multiple resources.

Figure 3B:
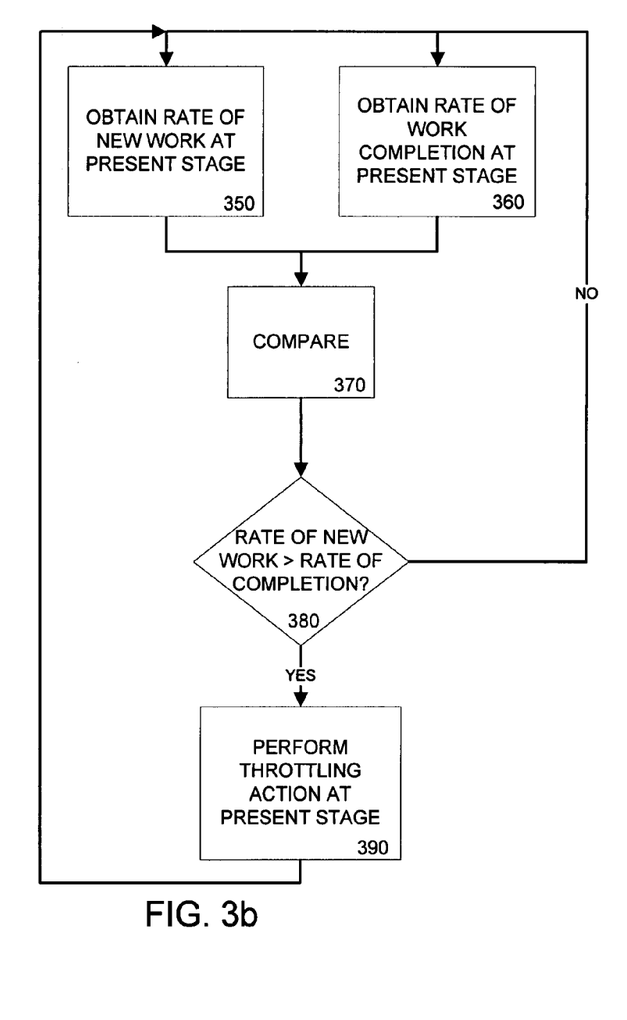

FIG. 3b is flow diagram illustrating further details of the steps 210-230 of the method of FIG. 2, in accordance with another embodiment of the invention. In this embodiment, the step 210 of monitoring the capacity of the present stage to perform work involves comparing the rate at which new work is being received at the present stage against the rate at which the new work is being completed. Specifically, as shown in FIG. 3b, the rate of new work received by the present stage is determined at step 350. The rate at which the present state is completing work is computed at step 360. At step 370, the two rates, rate of receipt of new work and rate of completion of work, are compared. If the rate of receipt of new work at the present stage is greater than the rate of completion of work at the present stage, as determined at step 380 of the method, then a throttling action is performed as the comparison shows that the stage is receiving new work faster than it is processing its current work load. The throttling action is performed at step 390 (essentially step 230 of FIG. 2). As in the embodiment illustrated in FIG. 3a, the steps illustrated in FIG. 3b may be performed periodically to provide continuous monitoring of the capacity of the present stage to perform work. If the comparison, at step 380, results in the completed work rate exceeding the receipt of work rate, a throttling action is not needed, and the process is repeated in order to evaluate a further need for throttling.

In the embodiment illustrated in FIG. 3b, the throttling action may comprise delaying the receipt of work at the present stage by a time Ds. According to an embodiment of the invention, Ds may be calculated by the following formula:

$$Ds \geq \left[ \frac{((Ni + Ns) \cdot Do)}{(No \cdot Of)} \right] - Di.$$

Where Ni is a number of items of work received by the present stage; Di is a duration over which Ni items of work were received by the present stage; No is a number of items of work processed by the present stage; Do is a duration over which No items were processed by the present stage; Of is an overdrive factor greater than or equal to 1.0; and Ns is a number of items of work about to be received into the present stage. The resulting time delay, Ds, is the time delay that needs to be incorporated at the present stage before the Ns items of work are received by the present stage in order that the stage not over-extend its capacity for processing work.

Figure 4:
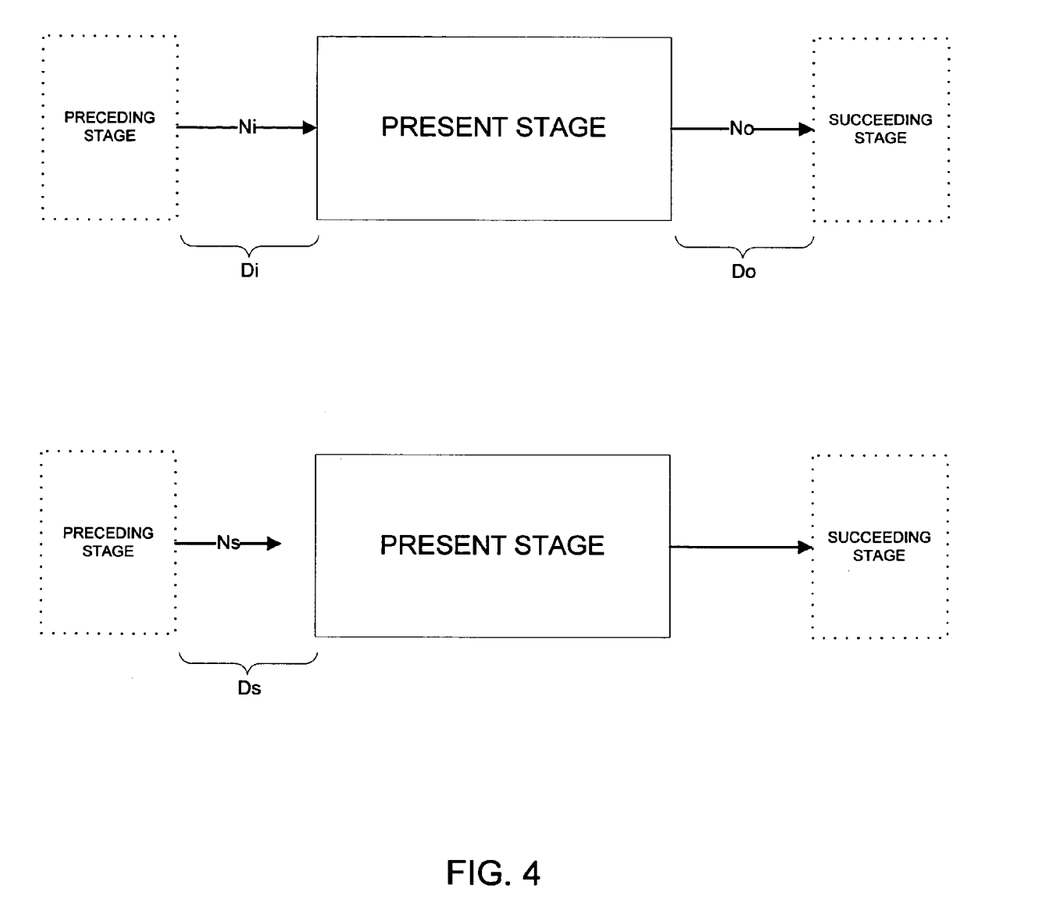
FIG. 4 is a block diagram illustrating the work flow associated with one stage of the distributed system of FIG. 1, in accordance with an embodiment of the present invention.

In one embodiment, the rates compared in FIG. 3b, in particular the rate of receipt of new work and rate of completion of work, are computed according to a sliding window protocol, which is illustrated in FIG. 4. The sliding window dynamically tracks data and uses that data to predict the current rate of receipt and rate of completion of the present stage. The overdrive factor Of is a variable greater than or equal to 1.0, which is used to provide the present stage with more work than the output rate indicates from the sliding window computation. This overdrive effect is employed because the output rate may not precisely represent the actual capacity of the system.

Referring to FIG. 4, one sliding window sample is shown, wherein Ni items of work are transmitted to the stage during Di time. In the same sample, No items of work are processed by the stage during a time Do. At a later time sample, Ns items of work are about to be transmitted to the stage. Ds is computed based on the sample rates computed during the prior sliding window sample, as shown in FIG. 4. The computation for Ds takes into consideration that the input rate after the Ns items of work are transmitted is required to be less than the output rate so that the stage is handling a controlled amount of work.

As with the embodiment illustrated in FIG. 3a, the information that the present stage receives from the succeeding stage (step 220 of the method of FIG. 2) about the capacity of the succeeding stage to perform work may also be determined and processed in the manner illustrated in FIG. 3b. For example, the present stage may receive information from the succeeding stage about the rates at which it is receiving and completing work. The present stage may then use that information in the manner illustrated in FIG. 3b to perform a throttling action, such as delaying the transmission of new work to the succeeding stage. Thus, throttling actions may be taken based on either the monitored rates of the present stage, information about the rates of the succeeding stage, or a combination of both.

Figure 5:
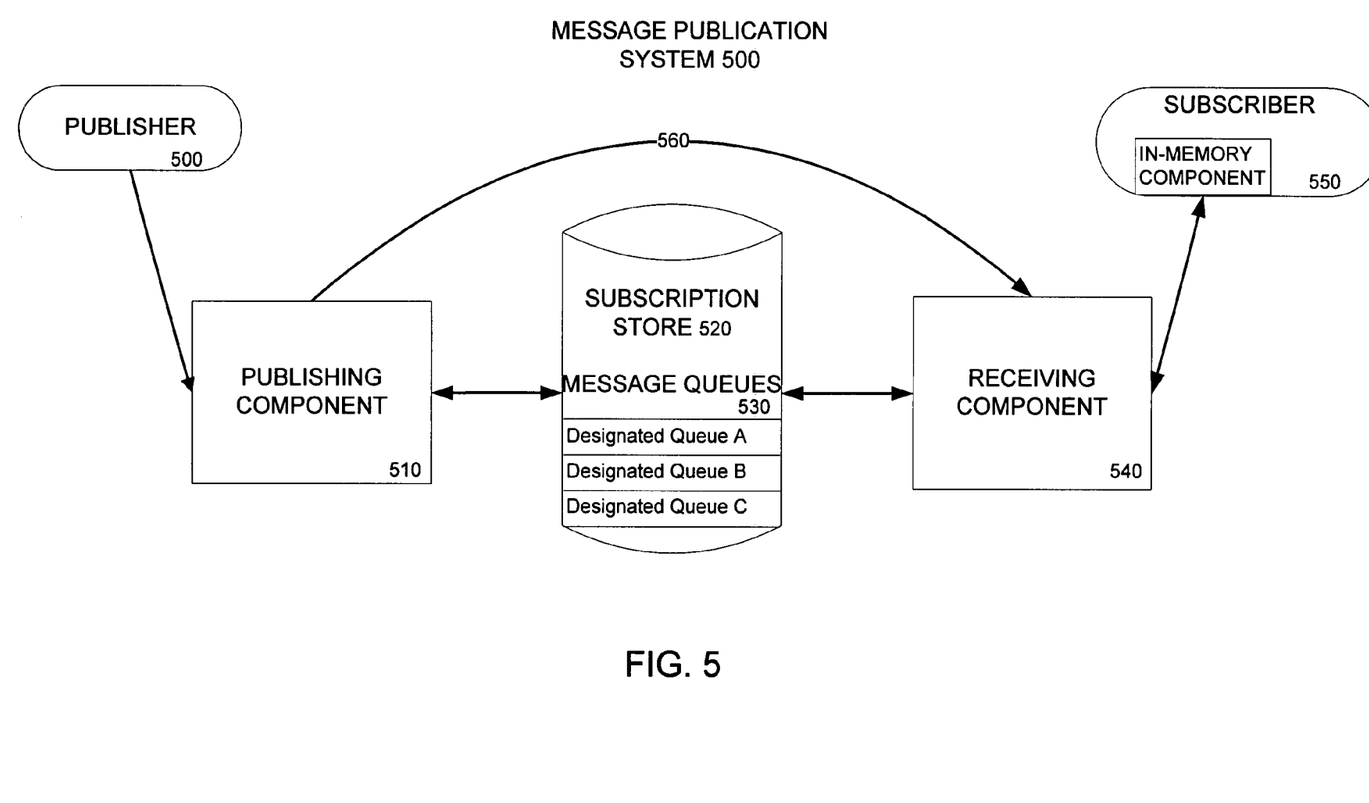
FIG. 5 is a block diagram of one example of a distributed system in which the present invention may be embodied.

FIG. 5 is an example of a distributed system in which the present invention may be embodied. The system illustrated in FIG. 5 is a message publication system 500. As shown, the components of this particular distributed system are a publisher 500, a publishing component 510, a subscription and message store 520 containing message queues 530, a receiving component 540, and a subscriber with an in-memory component 550. The system's task is to publish messages from the publisher 500 to the subscriber 550. The publishing component 510 exposes an application programming interface (API) to the publisher 500 so that the publisher 500 may interact with the publishing component 510 and post the intended message. The subscription store 520 is a dynamic and persistent database that maintains information regarding potential subscribers and the message types that each subscriber, such as subscriber 550, is interested in receiving. The publishing component 510 consults the subscription store 520 to obtain a listing of potential subscribers of the message to be published. Once the subscriber list has been obtained, the publishing component 510 causes the message to be placed into the designated queue of each identified subscriber. The subscription store 520 is divided into designated message queues 530. Generally, there is one message queue 530 for each subscriber. The receiving component 540 performs a polling process in order for a subscriber, such as the subscriber 550, to receive messages that are stored in the subscriber's designated queue 530. The receiving component 540 polls the message queues 530 for any new messages that may have been placed in the queue of a given subscriber. If at least one new message is detected in the queue of a given subscriber, the message is removed by the receiving component 540 and published to the subscriber so that the subscriber may process or operate on the message. The message may be subsequently marked to indicate that the receiving component 540 has polled the message from the queue. After the message has been processed by the subscriber, there is no need for it to stay in the queue. Accordingly, after message processing, the message is removed from the appropriate designated queue.

Each component 510, 520, 530, 540 and 550 of the above-described message publication system 500 represents a stage of a distributed system and, in accordance with the present invention, the throttling techniques discussed above may be performed at each of these stages to control the overall work load on the message publication system 500. It is understood that the message publication system 500 is just one example of a system that may embody the throttling and flow control techniques of the present invention described above.

Figure 6:
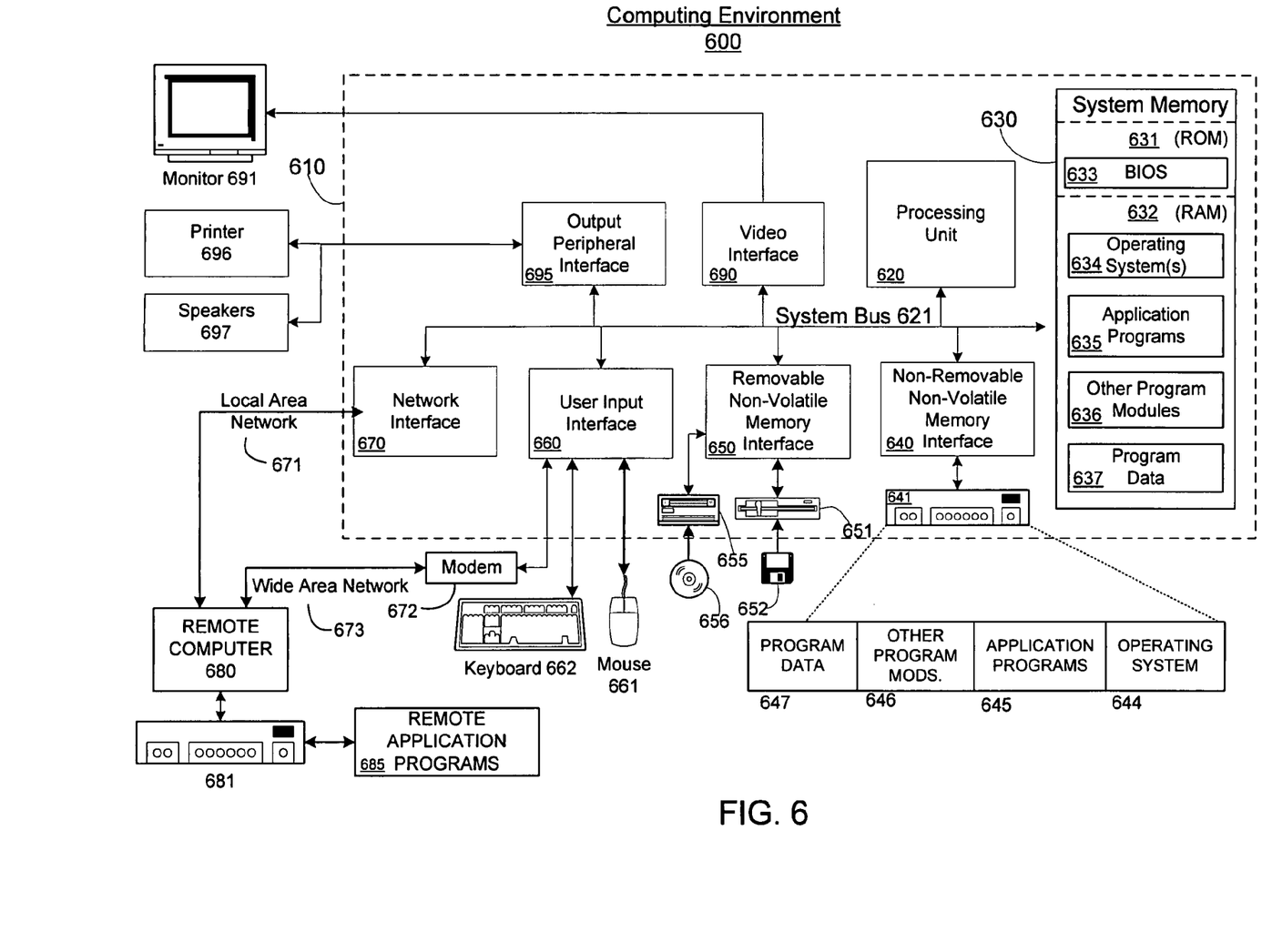
FIG. 6 is a is a block diagram representing an exemplary computing device in which the present invention may be implemented.

As can be appreciated, portions of the present invention may be implemented as a whole or in part in one or more computing systems or devices. FIG. 6 illustrates the functional components of one example of a computing system 600 in which aspects of the present invention may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. Program code and/or data can be implemented in the form of routines, programs, objects, modules, data structures and the like that perform particular functions.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, discussed above and illustrated in FIG. 6, provide storage of computer readable instructions, data structures, components, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673 such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

All or portions of the methods of the present invention described above may be embodied in hardware, software, or a combination of both. When embodied in software, the methods of the present invention, or certain aspects or portions thereof, may be embodied in the form of program code that when executed by a computing system cause the computing system to perform the methods of the present invention. This program code may be stored on any computer-readable medium, as that term is defined above.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A method for implementing workflow in a distributed system, the method comprising:

performing workflow in a distributed system comprising a plurality of workflow stages operating in sequence to perform work associated with a given task, wherein each stage of the system performs a portion of the work associated with the given task and consumes one or more resources in performing such work; and performing a workflow control process to control workflow in the distributed system, wherein performing a workflow control process comprises:

each stage monitoring its own capacity to perform work by using a sliding window to monitor a first number of items of work transmitted to the each stage during the sliding window and a second number of items of work processed by the each stage during the sliding window and to predict a rate of new work received by the each stage and a rate at which work is being completed by the each stage, the monitored capacity to perform work is based on the rate at which work is being completed by the each stage and an overdrive factor such that the monitored capacity to perform work is greater than the rate at which work is being completed, the monitoring performed by the stage comprising:

comparing a state of a resource of the stage to a threshold value;

each stage obtaining information from a succeeding stage indicating a capacity of the succeeding stage to perform work; and each stage performing a throttling action based on a comparison between the information obtained from the succeeding stage, a quantitative threshold value maintained by the each stage, and said monitoring of its own capacity to perform work, the performing a throttling action by the stage comprising:

performing a throttling action if the rate of new work received by the stage is greater than the rate at which work is being completed by the stage, and delaying the receipt of work by the stage by a time delay Ds, the time delay Ds being calculated in accordance with the following formula:

$$Ds \geq \left[ \frac{((Ni + Ns) \cdot Do)}{(No \cdot Of)} \right] - Di$$

where Ni is the first number of items of work received by the stage; Di is a duration over which Ni items of work were received by the stage; No is the second number of items of work processed by the stage; Do is a duration over which No items were processed by the stage; Of is the overdrive factor; and Ns is a number of items of work about to be received into the stage, wherein each of the stages of the system may perform throttling actions independently to improve the overall throughput of the system.

2. The method recited in claim 1, further comprising:

each stage communicating to a preceding stage information regarding its own capacity to perform work and the capacity of the succeeding stage to perform work.

3. The method recited in claim 1, wherein the monitoring performed by each stage comprises comparing a state of a resource of the stage to a threshold value.

4. The method recited in claim 3, wherein the resource monitored by a stage includes one or more resources consumed during the course of performing the work by the stage and comprises one of a system-wide usage of a physical memory, a process memory, a thread count, a number of open database connections, and the capacity in terms of concurrent messages.

5. The method recited in claim 3, wherein performing a throttling action by a stage comprises performing the throttling action by the stage if the state of the resource of the stage exceeds the threshold value.

6. The method recited in claim 3, wherein performing a throttling action by the stage comprises performing a throttling action by the stage if the rate of new work received by the stage is greater than the rate at which work is being completed by the stage.

7. A method for implementing workflow in a distributed computing environment, the method comprising:
    performing workflow in a distributed computing environment comprising a plurality of workflow stages operating in sequence to perform work associated with a given task, wherein each stage of the distributed computing environment performs a portion of the work associated with the given task and consumes one or more resources in performing such work;
    performing a workflow control process to control workflow in the distributed computing environment, wherein performing a workflow control process comprises:
        each stage monitoring its own capacity to perform work by using a sliding window to monitor a first number of items of work transmitted to the each stage during the sliding window and a second number of items of work processed by the each stage during the sliding window and to predict a rate of new work received by the each stage and a rate at which work is being completed by the each stage;
        each stage monitoring information from a succeeding stage indicating a capacity of the succeeding stage to perform work; and
        each stage performing a throttling action based on both a comparison between the information obtained from the succeeding stage and a quantitative threshold value maintained by the each stage and said monitoring of its own capacity to perform work,
        wherein each of the stages of the distributed computing environment may perform throttling actions independently to improve the overall throughput of the system, and
    wherein performing the throttling action by the stage comprises delaying the receipt of work by the stage by a time delay Ds determined as the function:

$$Ds \geq \left[\frac{((Ni + Ns) \cdot Do)}{(No \cdot Of)}\right] - Di$$

where Ni is the first number of items of work received by the stage, Di is a first duration over which the first number of items of work were received by the stage, No is the second number of items of work processed by the stage, Do is a duration over which the second number of items of work were processed by the stage, Of is an overdrive factor configured to increase the monitored capacity to perform work of the each stage, and Ns is a third number of items of work about to be received into the stage.

8. The method recited in claim 3, wherein performing a throttling action by the stage comprises performing a throttling action by the stage if the information received from the succeeding stage indicates that the succeeding stage is unable to sustain the work generated by one or more preceding systems.

9. A computer readable device, disk, or memory storing program code which is executable by a computer to implement method steps for controlling workflow by a stage in a system comprising a plurality of workflow stages that operate in sequence to perform work associated with a given task, wherein each stage of the system performs a portion of the work associated with the given task, and wherein a given stage receives work from a previous stage and transmits work to a subsequent stage, wherein the method steps for controlling workflow by a given stage in the system comprise:
    the stage monitoring its own capacity to perform work by using a sliding window to monitor a first number of items of work transmitted to the each stage during the sliding window and a second number of items of work processed by the each stage during the sliding window and to predict a rate of new work received by the each stage and a rate at which work is being completed by the each stage, the monitored capacity to perform work is based on the rate at which work is being completed by the each stage and an overdrive factor such that the monitored capacity to perform work is greater than the rate at which work is being completed, the monitoring performed by the stage comprising:
        comparing a state of a resource of the stage to a threshold value;
    the stage obtaining information from a succeeding stage indicating a capacity of the succeeding stage to perform work; and
    the stage performing a throttling action based on both a comparison between the information obtained from the succeeding stage and a quantitative threshold value maintained by the stage and said monitoring of its own capacity to perform work, the performing a throttling action by the stage comprising:
        performing a throttling action if the rate of new work received by the stage is greater than the rate at which work is being completed by the stage, and
        delaying the receipt of work by the stage by a time delay Ds, the time delay Ds being calculated in accordance with the following formula:

$$Ds \geq \left[\frac{((Ni + Ns) \cdot Do)}{(No \cdot Of)}\right] - Di$$

where Ni is the first number of items of work received by the stage; Di is a duration over which Ni items of work were received by the stage; No is the second number of items of work processed by the stage; Do is a duration over which No items were processed by the stage; Of is the overdrive factor; and Ns is a number of items of work about to be received into the stage,
    wherein the stage performs throttling actions independently of throttling actions of other stages of the system to improve the overall throughput of the system.

10. The computer readable device, disk, or memory recited in claim 9, storing further program code for the stage communicating to a preceding stage information regarding its own capacity to perform work and the capacity of the succeeding stage to perform work.

11. The computer readable device, disk, or memory recited in claim 9, wherein the resource monitored by the stage includes one or more resources consumed by the stage during the course of performing the work within the stage and comprises one of a system-wide usage of a physical memory, a process memory, a thread count, a number of open database connections, and the capacity in terms of concurrent messages.

12. The computer readable device, disk, or memory recited in claim 9, wherein performing a throttling action by the stage comprises performing a throttling action if the state of the monitored resource of the stage exceeds the threshold value.

13. The computer readable device, disk, or memory recited in claim 9, wherein performing a throttling action by the stage comprises performing a throttling action if the information received from the succeeding stage indicates that the succeeding stage is unable to sustain the work generated by one or more preceding systems.

\* \* \* \* \*